US012661747B2

(12) United States Patent
Ookura

(10) Patent No.: US 12,661,747 B2
(45) Date of Patent: Jun. 23, 2026

(54) TOOL MANAGEMENT DEVICE THAT MANAGES TOOLS OF TARGET DEVICE INCLUDING TOOL HOLDING MECHANISM THAT HOLDS A PLURALITY OF TOOLS

(71) Applicant: FANUC CORPORATION, Yamanashi (JP)

(72) Inventor: Takuma Ookura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 545 days.

(21) Appl. No.: 18/249,970

(22) PCT Filed: Nov. 4, 2021

(86) PCT No.: PCT/JP2021/040495
§ 371 (c)(1),
(2) Date: Apr. 21, 2023

(87) PCT Pub. No.: WO2022/097660
PCT Pub. Date: May 12, 2022

(65) Prior Publication Data
US 2023/0398650 A1 Dec. 14, 2023

(30) Foreign Application Priority Data
Nov. 6, 2020 (JP) ................................. 2020-185677

(51) Int. Cl.
*B23Q 3/157* (2006.01)
(52) U.S. Cl.
CPC ................................ *B23Q 3/15713* (2013.01)

(58) Field of Classification Search
CPC .... B23Q 3/15713; B23Q 3/157; B23Q 3/155; B23Q 3/00; Y02P 90/02; Y02P 90/00;
(Continued)

(56) References Cited

U.S. PATENT DOCUMENTS 3,052,999 A * 9/1962 Sedgwick .............. B23Q 11/08
407/120
3,355,798 A * 12/1967 Drechsler .......... B23Q 3/15722
483/8

(Continued)

FOREIGN PATENT DOCUMENTS

JP S62-48439 A 3/1987
JP H2-172649 A 7/1990
(Continued)

*Primary Examiner* — Lawrence Averick
(74) *Attorney, Agent, or Firm* — HAUPTMAN HAM, LLP

(57) ABSTRACT

A tool management device according to the present invention that manages the tools, for a target device including a tool holding mechanism that holds a plurality of tools, includes an information acquisition unit that acquires configuration information including a current tool holding state in the tool holding mechanism, a holding position setting unit that sets holding positions at which the tools are held in the tool holding mechanism based on the above-described configuration information and tool information on the tools, and a command generation unit that generates a drive command for moving the holding positions in the tool holding mechanism to a transfer position at which the tools are transferred.

8 Claims, 10 Drawing Sheets

(58) Field of Classification Search
CPC ...... G05B 19/042; G05B 19/04; G05B 19/02;
G05B 19/00
USPC ...................................................... 183/58, 16
See application file for complete search history.

(56) References Cited

U.S. PATENT DOCUMENTS

| | | | | |
|---|---|---|---|---|
| 3,358,360 | A * | 12/1967 | Zankl | B23Q 3/15766 |
| | | | | 483/44 |
| 3,760,490 | A * | 9/1973 | Burg | B23Q 3/15713 |
| | | | | 483/38 |
| 4,581,810 | A | 4/1986 | Kawakami et al. | |
| 6,836,698 | B2 * | 12/2004 | Fujishima | G05B 23/0283 |
| | | | | 702/182 |
| 9,527,177 | B2 * | 12/2016 | Grob | B23Q 11/08 |
| 9,878,409 | B2 * | 1/2018 | Grob | B23Q 1/017 |
| 9,914,189 | B2 * | 3/2018 | Burkhardt | B23B 39/161 |
| 10,252,385 | B2 * | 4/2019 | Kanamoto | B23Q 11/0042 |
| 12,493,283 | B2 * | 12/2025 | Kitamura | G05B 19/4097 |
| 2004/0193307 | A1 * | 9/2004 | Fujishima | G05B 23/0283 |
| | | | | 700/169 |
| 2015/0057139 | A1 * | 2/2015 | Canuto | B23Q 3/15536 |
| | | | | 483/65 |
| 2016/0167184 | A1 * | 6/2016 | Burkhardt | B23Q 1/625 |
| | | | | 409/172 |
| 2016/0176002 | A1 * | 6/2016 | Grob | B23Q 1/4852 |
| | | | | 409/185 |
| 2016/0193704 | A1 * | 7/2016 | Grob | B23Q 1/015 |
| | | | | 409/185 |
| 2016/0199955 | A1 * | 7/2016 | Grob | B23Q 3/15713 |
| | | | | 409/189 |
| 2017/0190008 | A1 * | 7/2017 | Kanamoto | B23Q 3/1574 |
| 2020/0033836 | A1 | 1/2020 | Hayashi | |
| 2021/0178539 | A1 * | 6/2021 | Eble | B23Q 3/15713 |
| 2021/0291309 | A1 * | 9/2021 | Kasahara | B23Q 17/2461 |
| 2023/0103884 | A1 * | 4/2023 | Asada | B23Q 15/12 |
| | | | | 483/66 |
| 2024/0134351 | A1 * | 4/2024 | Kitamura | G05B 19/4097 |
| 2024/0231320 | A9 * | 7/2024 | Kitamura | G05B 19/4097 |

FOREIGN PATENT DOCUMENTS

| | | | |
|---|---|---|---|
| JP | | H10-58279 A | 3/1998 |
| JP | | 2008-238356 A | 10/2008 |
| JP | | 2020-15143 A | 1/2020 |
| JP | | 6779406 B1 | 11/2020 |

* cited by examiner

FIG. 6

TOOL MANAGEMENT DEVICE THAT MANAGES TOOLS OF TARGET DEVICE INCLUDING TOOL HOLDING MECHANISM THAT HOLDS A PLURALITY OF TOOLS

RELATED APPLICATIONS

The present application is a National Phase of International Application No. PCT/JP2021/040495 filed Nov. 4, 2021, which claims priority to Japanese Application No. 2020-185677, filed Nov. 6, 2020.

TECHNICAL FIELD

The present invention relates to a tool management device that manages tools of a target device including a tool holding mechanism that holds a plurality of tools.

BACKGROUND ART

In a case of performing a plurality of types of machining on a workpiece using a plurality of tools in a machine tool that performs machining and the like, a plurality of tools need to be attached to a main shaft head for replacement each time the type of machining is changed in order to make the plurality of tools approach the workpiece. Thus, this increases complicated tasks and a tool swapping time. In order to solve this, there is known, for example, a machine tool such as a turret lathe in which a turret having a plurality of tool mounting surfaces on which a plurality of tools can be mounted is located so as to be rotatable, and the turret is rotated to switch a tool to face a workpiece.

As an example of such a machine tool, Patent Literature 1, for example, discloses a turret tool selection command method of selectively commanding any tool for a turret including a plurality of turret surfaces, a plurality of tools being mounted on at least one of the turret surfaces, the turret being movable in each of an X-axis direction in which the turret moves away from or approaches a workpiece shaft core and a Y-axis direction orthogonal to the X-axis direction and a Z-axis direction which is a center line of the workpiece, the turret being capable of turning, in which each of the turret surfaces is provided with a turret surface number and each of the tools is provided with a tool number, Y-axis positional information corresponding to the above-described tool number is set and stored in advance, any turret surface number and any tool number are designated at the same time by a single program command when a machining program is generated, one of the turret surfaces that corresponds to the designated turret surface number is identified when the machining program is executed and Y-axis positional information that corresponds to the designated tool number is read, and positioning of the tool in the Y-axis direction is performed, as well as a numerically controlled device that implements the method. It is described that this enables identification of a turret surface and selection of a tool to be selected with a single program command, so that a program generation work is facilitated, and the program itself is also simplified.

On the other hand, a system is known in which in a machine tool that performs machining with a plurality of tools, a tool storage device that stores and manages the plurality of tools used for machining is provided together with the machine tool, an automatic tool swapping mechanism is located between the machine tool and the tool storage device, so that the plurality of tools are exchanged between the machine tool and the tool storage device. In the tool storage device to be applied to such a system, an automatic control device for storing the plurality of tools at a settled position in the tool storage device is usually used.

As an example of such a tool storage device, Patent Literature 2, for example, discloses a tool replacing device that replaces tools stored in a tool magazine of a machine tool at the time of setup, the tool replacing device including a sub tool magazine that is provided adjacent to the tool magazine and stores tools to be used in a machining operation to be carried out next, a tool position recognizing means for recognizing a storage position of the tools stored in this sub tool magazine, a memory that stores a machining program of the machining operation to be carried out next and stores a tool replacement instruction program in the order of execution of the machining program to be carried out next and before the start of the machining program to be carried out next, and a tool replacing means for reading the tool replacement instruction program stored in the memory before the start of the machining operation to be carried out next, and replacing tools stored in the sub tool magazine recognized by the tool position recognizing means with tools stored in the tool magazine. It is described that this can provide a tool replacing device that can reduce a setup time, improve reliability, and reduce costs.

CITATION LIST

Patent Literature

[Patent Literature 1]
    Japanese Patent Laid-Open No. 10-58279
[Patent Literature 2]
    Japanese Patent Laid-Open No. 2-172649

SUMMARY OF INVENTION

Technical Problem

In a control device that performs tool management for a machine tool including a turret as illustrated above and a tool replacing device including a tool magazine, tool information such as a tool position and size of each of a plurality of tools mounted on or stowed in each of target devices are stored or saved collectively in advance. Therefore, this causes a problem in that when the number of tools to be used increases, an amount of memory required for storing the tool information also increases.

In addition, the control device that controls a target device is usually operated by a control program corresponding to specifications of a turret or a tool magazine used in the controlled target device. Therefore, this also causes a problem of a failure to deal with a change in specifications such as a change of the upper limit of the number of tools set when the target device is designed or a case where the target device itself targeted for control is changed.

Under the circumstances, it is required that a tool management device that can deal with a change in specifications of a target device or a change of the target device itself, if any, and eliminates the need to expand or change a memory.

Solution to Problem

A tool management device according to one aspect of the present invention that manages the tools, for a target device including a tool holding mechanism that holds a plurality of tools, comprises an information acquisition unit that acquires configuration information including a current tool holding state in the tool holding mechanism, a holding position setting unit that sets holding positions at which the tools are held in the tool holding mechanism based on the above-described configuration information and tool information of the tools, and a command generation unit that generates a drive command for moving the holding positions in the tool holding mechanism to a transfer position at which the tools are transferred.

Advantageous Effects of Invention

According to the one aspect of the present invention, since the information acquisition unit acquires the configuration information including the current tool holding state in the tool holding mechanism, the tool management device itself does not require a memory for always storing the configuration information about the target device. Further, the holding position setting unit sets the holding position at which a tool is held in the tool holding mechanism based on the above-described configuration information and the tool information on the tools, and the command generation unit generates the drive command for moving the holding position in the above-described tool holding mechanism to the transfer position at which the tool is transferred. Thus, the holding position is set based on the configuration information acquired by the information acquisition unit, and the drive command is generated. Therefore, even if there is a change in the specification of the target device or a change in the target device itself, it is possible to deal with, and to eliminate the need to add or change the memory.

BRIEF DESCRIPTION OF DRAWINGS

FIG. 6 is an outline drawing showing a first modification of the tool management device according to the first embodiment.

DESCRIPTION OF EMBODIMENTS

Hereinafter, embodiments of a tool management device according to a representative example of the present invention that, for a target device including a tool holding mechanism that holds a plurality of tools, manages the tools will be described in conjunction with the drawings.

First Embodiment

Figure 1:
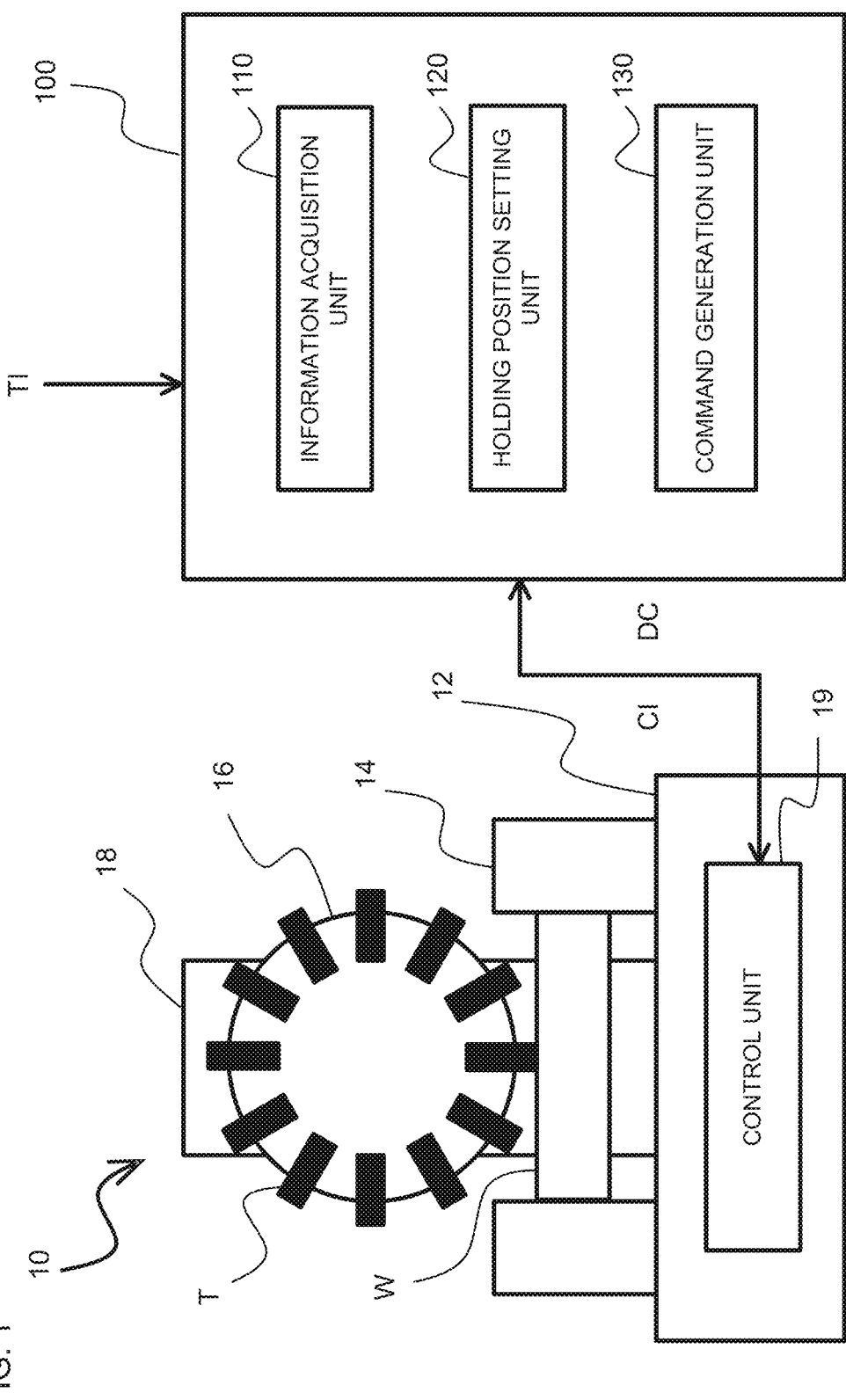
FIG. 1 is a block diagram showing a relationship between a tool management device according to a first embodiment of the present invention and a target device.
Figure 2:
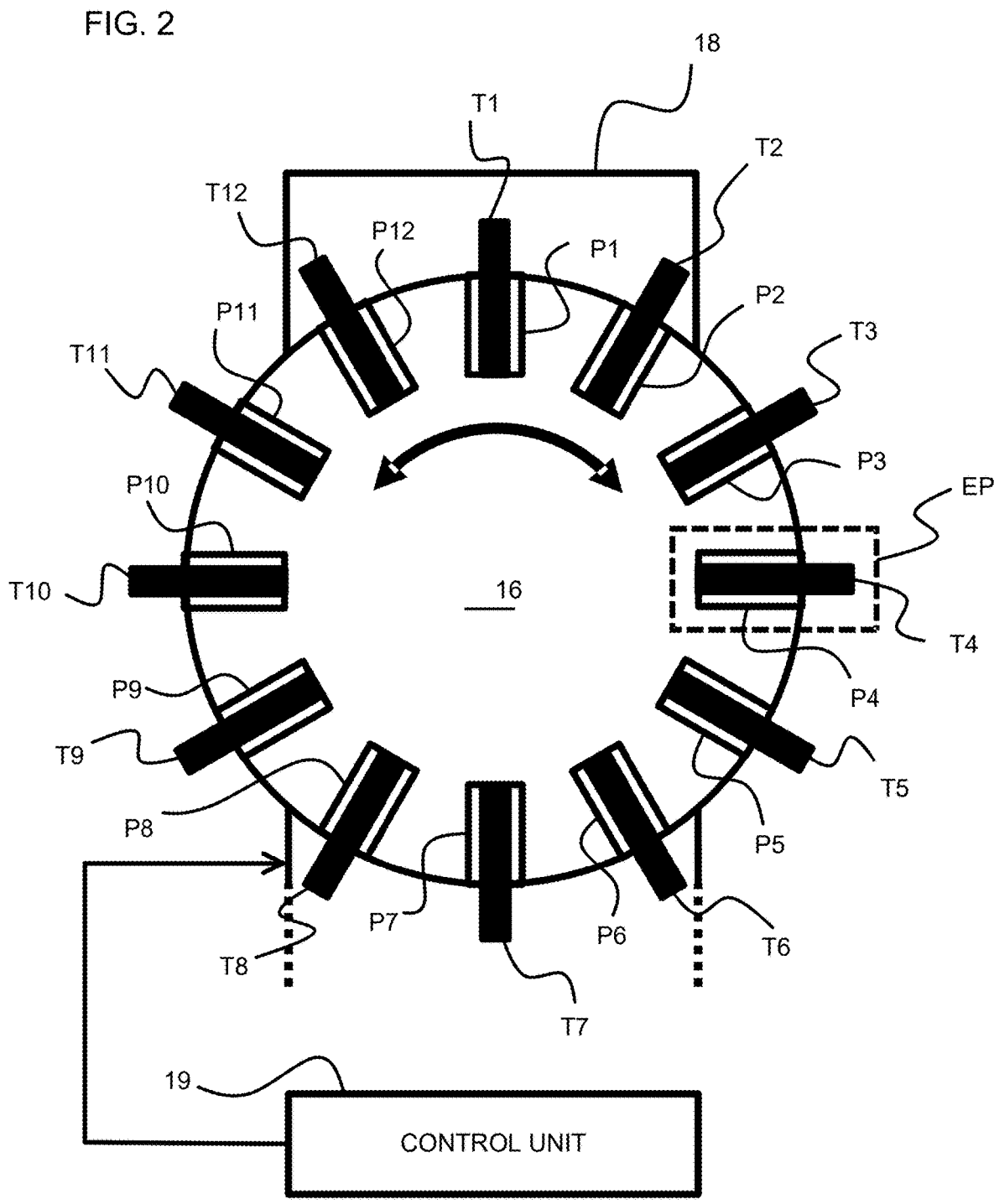
FIG. 2 is an outline drawing showing in an extracted manner a part of a specific structure of the target device shown in FIG. 1.

FIG. 1 is a block diagram showing a relationship between a tool management device according to a first embodiment and a target device, which is a representative example of the present invention. FIG. 2 is an outline drawing showing in an extracted manner a part of a specific structure of the target device shown in FIG. 1.

As shown in FIG. 1, a tool management device 100 according to the first embodiment is configured as a machining system that is connected by wire or wirelessly to a target device (machine tool) 10 that holds a plurality of tools and exchanges signals and data with the machine tool 10. Herein, in the first embodiment, the machine tool 10 including a turning turret 16 as the tool holding mechanism is applied.

The machine tool 10 is, as an example, configured as a turret lathe including a base part 12, a workpiece holding part 14 that holds a workpiece W so as to be rotatable around a predetermined rotation axis, the turning turret 16 that holds a plurality of tools T, a turret holding part 18 having a built-in drive mechanism that rotationally moves the turning turret 16, and a control unit 19 that controls operations of the entire machine tool 10. In such a turret lathe, the plurality of tools T are mounted on the turning turret 16 in such a manner that machining blades are radially exposed, and the turning turret 16 rotationally moves based on a command from the control unit 19 so that a specific tool T is directed to and brought into contact with the workpiece W and machining is performed.

The turning turret 16 has a holding mechanism such as a chuck for radially mounting a plurality of tools T1 to T12 at holding positions P1 to P12, respectively, as shown in FIG. 2. Herein, in the specific example of FIG. 2, the holding positions P1 to P12 are located at equal intervals (that is, intervals of an angle of 30°) on an outer periphery of the turning turret 16.

In addition, a locating position (angle) of each of the holding positions P1 to P12 is determined on the turning turret 16 using the angle of the holding position P1 as a reference angle (0°). The amount of turning (angle) when a turning command for the turning turret 16 is generated in a command generation unit 130 of the tool management device 100 which will be described later is obtained based on the reference angle. A transfer position EP at which the tool T is transferred (that is, attached/detached) is further set on the turning turret 16.

As shown in FIG. 1, the tool management device 100 includes an information acquisition unit 110 that acquires configuration information CI including a current tool holding state in a tool holding mechanism (the turning turret 16) of the machine tool 10, a holding position setting unit 120 that sets the holding positions P1 to P12 on the turning turret 16 at which the tools T1 to T12 are held based on the configuration information CI and tool information TI on the tools T1 to T12, and the command generation unit 130 that generates a drive command DC for moving the set holding positions P1 to P12 to the transfer position EP. Herein, the tool information TI includes information such as the total number and specification of the tools T managed and the types of machining that the individual tools T execute, which is acquired by manual input by an operator or by the information acquisition unit 110 accessing an external storage device (not shown) or the like.

On the other hand, the configuration information CI includes information such as the structure of the turning turret 16 of the machine tool 10 and whether or not the tools T1 to T12 are currently held at the respective holding positions P1 to P12, and is usually held by the control unit 19 of the machine tool 10. As a result, the tool management apparatus 100 according to the present invention does not require a permanent memory for storing and saving the current tool T holding information.

The information acquisition unit 110 of the tool management device 100, as an example, acquires the configuration information CI on the machine tool 10 from the control unit 19 of the machine tool 10, acquires the tool information TI on the tools T from the outside, and temporarily saves these pieces of information. The information acquisition unit 110 also has a function of extracting the whole or a part of the configuration information CI and the tool information TI having been acquired, and a function of sending extracted information to the holding position setting unit 120.

The holding position setting unit 120 sets the holding positions P1 to P12 for the tools T to be newly mounted on the turning turret 16 based on the configuration information CI and the tool information TI sent from the information acquisition unit 110. Specifically, the holding position setting unit 120 sets the holding positions P1 to P12 for the individual tools T to be mounted in consideration of a holding status of the tools T (that is, an availability of the holding positions P1 to P12) on the turning turret 16 in the configuration information CI, and the number and specification (such as size) of the tools T to be mounted from now in the tool information TI. Then, information on the set holding positions P1 to P12 is sent to the command generation unit 130.

The command generation unit 130 generates the drive command DC for moving the set holding position P on the turning turret 16 to the transfer position EP of the tool T based on the information on the holding position P sent from the holding position setting unit 120. Specifically, an angle currently formed by the set holding position P and the transfer position EP is calculated, and the drive command DC for a turning operation of the turret corresponding to the formed angle is generated. Then, the generated drive command DC is transmitted to the control unit 19 of the machine tool 10.

Herein, when the command generation unit 130 calculates the angle formed by the set holding position P and the transfer position EP, an approach of directly calculating the formed angle, or an approach of, using a specific holding position P on the turning turret 16 as a "reference position", calculating the formed angle from a difference between an angle from the reference position to the set holding position P and an angle from the reference position to the transfer position EP may be adopted, as an example. In other words, in a case of using the holding position P1 shown in FIG. 2, for example, as the "reference position" on the turning turret 16, and when the holding position P11 is set, the angle from the holding position P11 to the holding position P1 as the reference position is 60°, and the angle from the holding position P1 to the transfer position EP is 90°. Thus, an instructed angle for the turning operation is 120°.

Next, a specific operation of the tool management device according to the first embodiment will be described using FIG. 3 to FIG. 5. Note that the specific examples shown in FIG. 3 to FIG. 5 illustrate cases of mounting the tool T on the turning turret 16 from now, but may be applied to a case of detaching a designated tool T from the turning turret 16 or swapping the designated tool T with another tool T.

Figure 3:
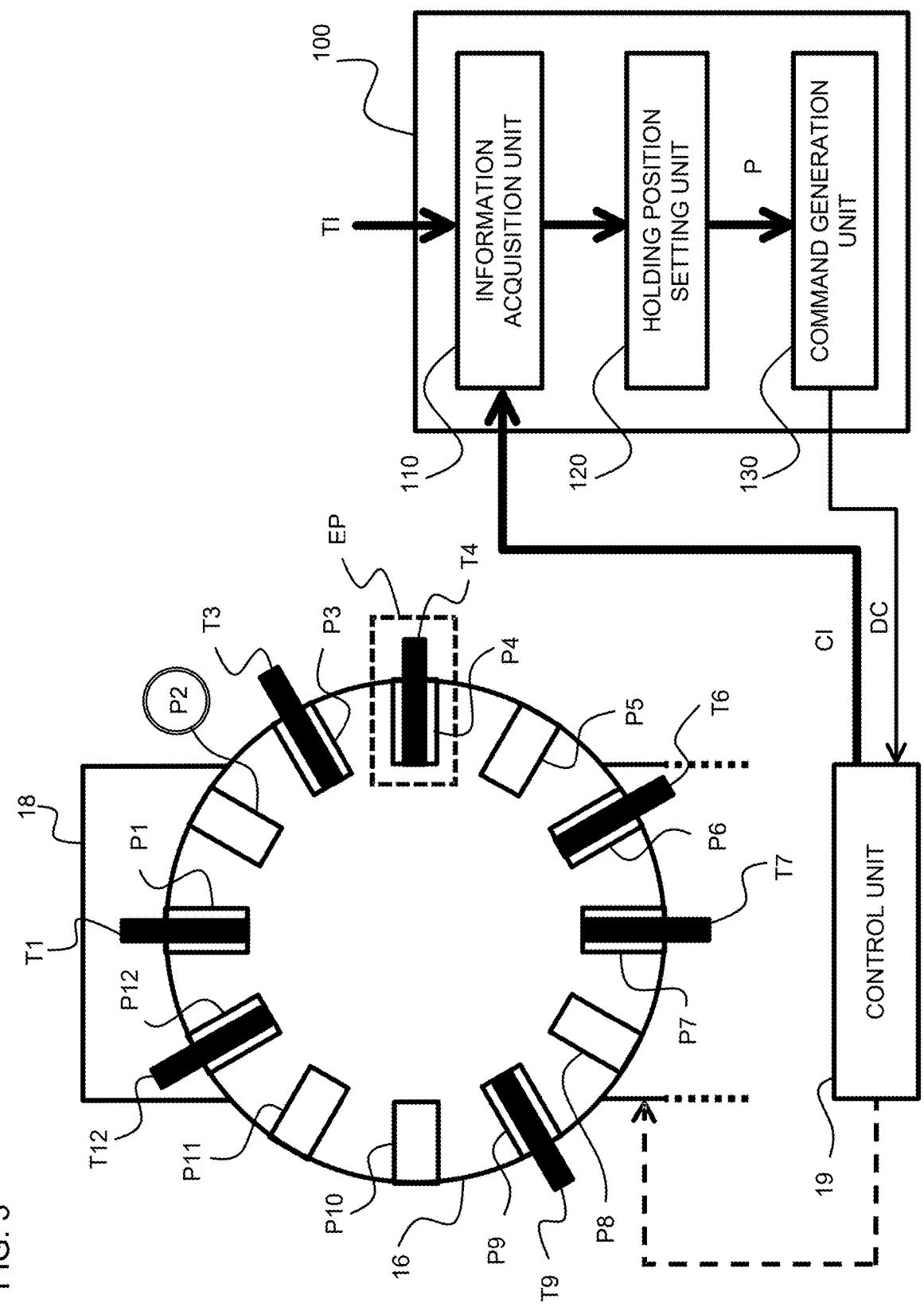
FIG. 3 is a schematic view showing an example of an operation of a machine tool in response to a command from the tool management device according to the first embodiment.
Figure 4:
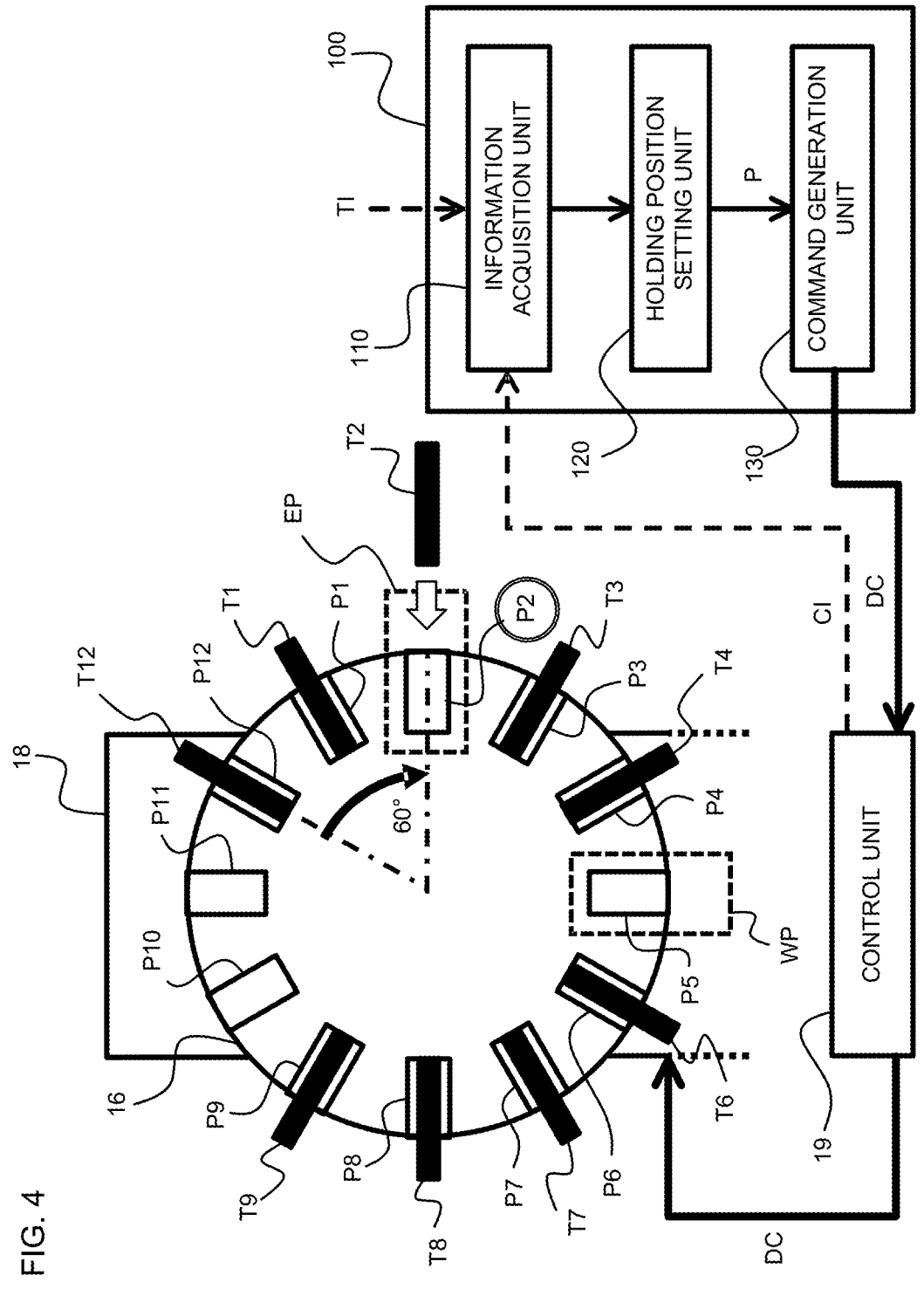
FIG. 4 is a schematic view showing an example of an operation of the machine tool in response to a command from the tool management device according to the first embodiment.
Figure 5:
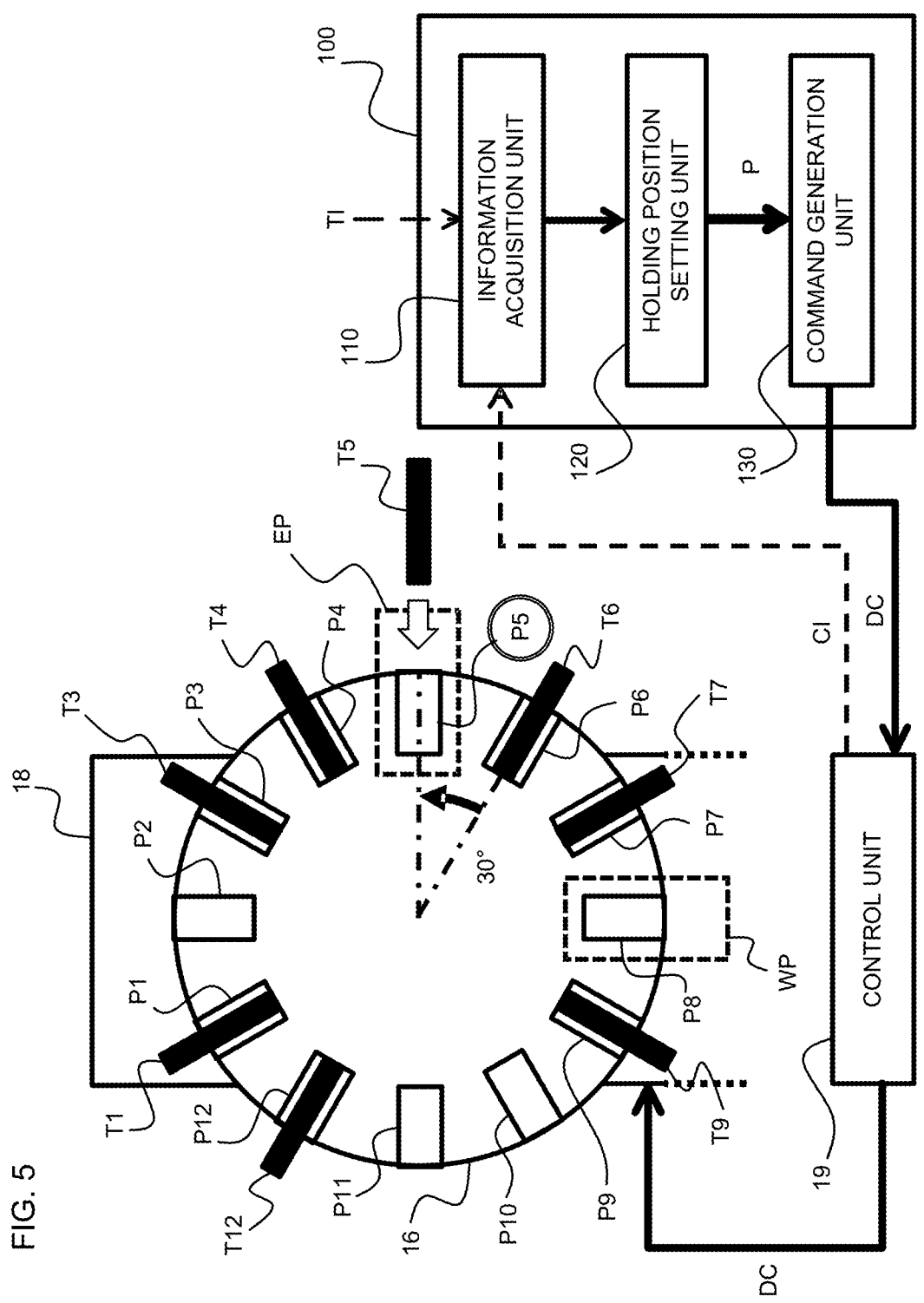
FIG. 5 is a schematic view showing an example of an operation of the machine tool in response to a command from the tool management device according to the first embodiment.

FIG. 3 to FIG. 5 are schematic views each showing an example of an operation of the machine tool in response to a command from the tool management device according to the first embodiment. As shown in FIG. 3, in the tool management device 100 according to the first embodiment, the information acquisition unit 110 first acquires the configuration information CI about the turning turret 16 from the control unit 19 of the machine tool 10.

As described above, the configuration information CI includes, as an example, information such as the number and locations of the holding positions P1 to P12 provided on the turning turret 16, the number and numbers of the tools T1 to T12 already mounted at the holding positions P1 to P12, and further, a current angle of the holding position P1 used as the reference position. Note that a sensor provided at each of the holding positions P1 to P12 may detect information about the presence or absence of the tool T, so that the positions at which the tools T1 to T12 described above are mounted may be acquired via the control unit 19.

The information acquisition unit 110 acquires the tool information TI concerning tools T to be swapped from the outside together with the configuration information CI. The tool information TI at this time includes the number and specification of the tools T to be swapped, and the like, as described above. Then, the information acquisition unit 110 sends the configuration information CI and the tool information TI having been acquired to the holding position setting unit 120.

The holding position setting unit 120 selects any of the holding positions P1 to P12 on the turning turret 16 suitable for the tool T to be swapped based on the configuration information CI and the tool information TI, and sends number information on the selected holding position to the command generation unit 130. Specifically, in the case of the location as shown in FIG. 3, for example, the holding position P2 which is present closest to the holding position P1 used as the reference position and at which the tool T is not mounted is selected.

The command generation unit 130 calculates the amount of movement by which the turning turret 16 should move for positioning the holding position P2 for the tool T set by the holding position setting unit 120 at the transfer position EP of the tool T (that is, the angle at which the turning turret 16 should turn), and generates the drive command DC for the control unit 19 of the machine tool 10 for turning the turning turret 16 by the calculated amount of movement. Specifically, the command generation unit 130 calculates a turning angle (60° shown in FIG. 4) from the position of the holding position P2 to the transfer position EP shown in FIG. 3, generates the drive command DC in a clockwise direction corresponding to the turning angle, and outputs the drive command DC to the control unit 19.

Then, in a case of mounting (or swapping) the plurality of tools T on the turning turret 16, the holding position setting unit 120 and the command generation unit 130 repeat the operations described above based on the configuration information CI having already been acquired. By performing such operations, the information acquisition unit 110 acquires the configuration information CI including the current tool holding state on the tool holding mechanism (the turning turret 16). Therefore, it is not necessary to add a memory for always storing the configuration information CI of the machine tool 10 in the tool management device 100 itself.

Note that in a case where there are a plurality of holding positions suitable for the tool T intended to be mounted as shown in FIG. 5, it may be configured to adopt a holding position at which the amount of movement (that is, the turning angle) from the current position to the transfer position EP is minimized. Specifically, since the amount of movement (a turning angle of 30°) of the holding position P5 is smaller than the amount of movement (a turning angle of 60°) of the holding position P2, the holding position P5 may be selected, and the drive command DC in the counterclockwise direction may be outputted. This can shorten a mounting time (swapping time) of the tool T.

Next, modifications of the tool management device according to the first embodiment will be described using FIG. 6 to FIG. 8.

Figure 6:
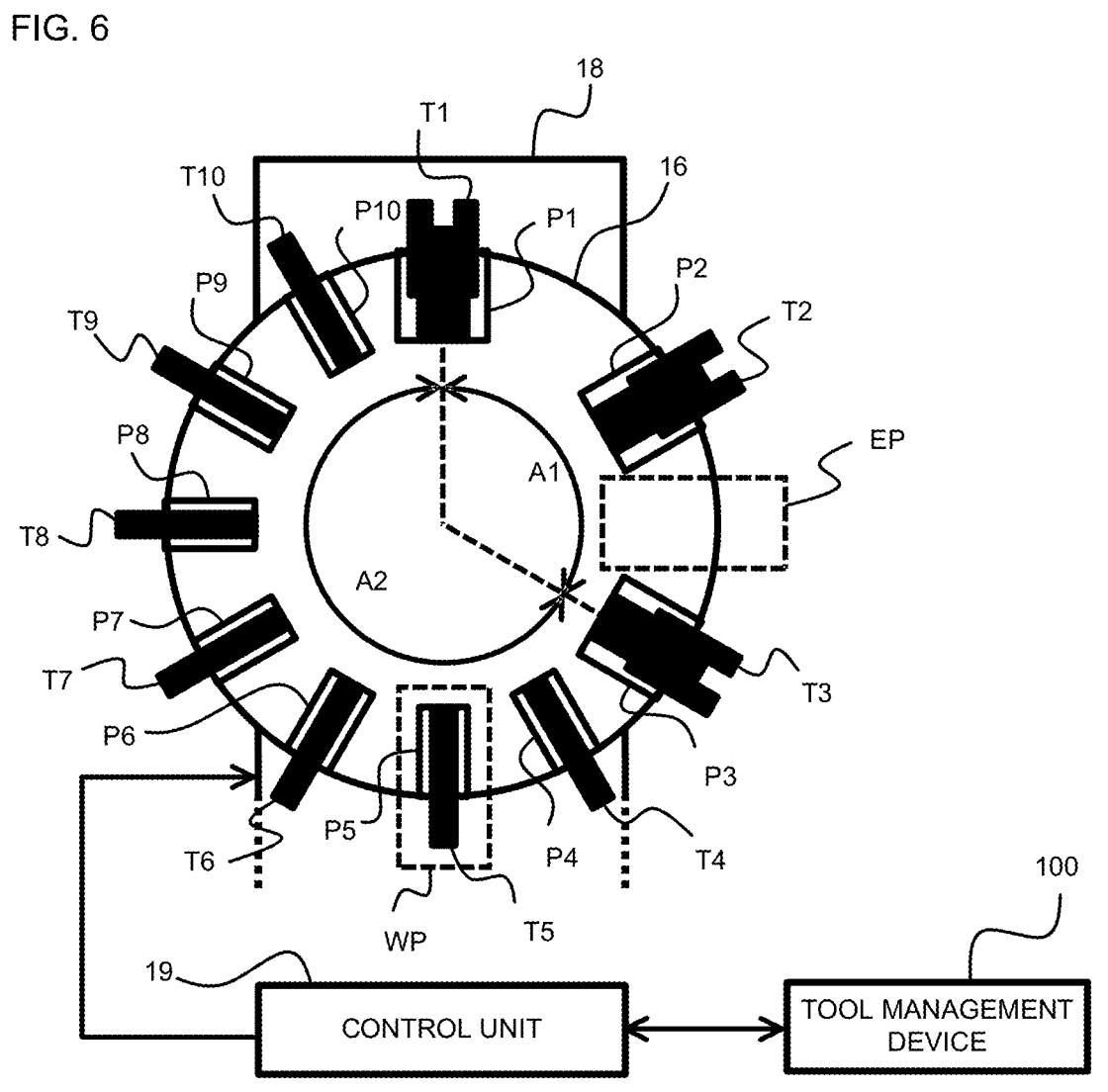

FIG. 6 is an outline drawing showing a first modification of the tool management device according to the first embodiment. The first modification shows a case where the tools T1 to T3 having a large diameter and the tools T4 to T10 having a small diameter are mounted on the turning turret 16 of the machine tool 10 in a mixed manner.

In other words, as shown in FIG. 6, the turning turret 16 applied to the tool management device 100 of the first modification has a plurality of classified regions A1 and A2 for respective types of the tools T as indicated by the tools T1 to T3 having a large diameter and the tools T4 to T10 having a small diameter described above. Then, the holding position setting unit 120 of the tool management device 100 sets the holding position P for each of the tools T using a calculation reference position in each of the above-described classified regions A1 and A2 as a reference.

Specifically, for the tools T1 to T3 having a large diameter, the holding positions P1 to P3 conformed to tools having a large diameter are located at equal intervals in the classified region A1, and the amount of movement is calculated with the holding position P1 set at the reference position as a calculation reference of the amount of movement (the turning angle). Similarly, for the tools T4 to T10 having a small diameter, the holding positions P4 to P10 conformed to tools having a small diameter are located at equal intervals in the classified region A2, and the amount of movement is calculated with the holding position P4 set at the reference position as a calculation reference of the amount of movement (turning angle).

Such a configuration enables a plurality of types of the tools T having specifications suitable for the material of workpieces and types of machining to be mounted on the turning turret 16 at the same time and machined selectively. Note that although the first modification shown in FIG. 6 illustrates the case of two types of the tools T having a large diameter and a small diameter, a case where there are three or more types of the tools T can be dealt with by increasing classified regions.

Figure 7:
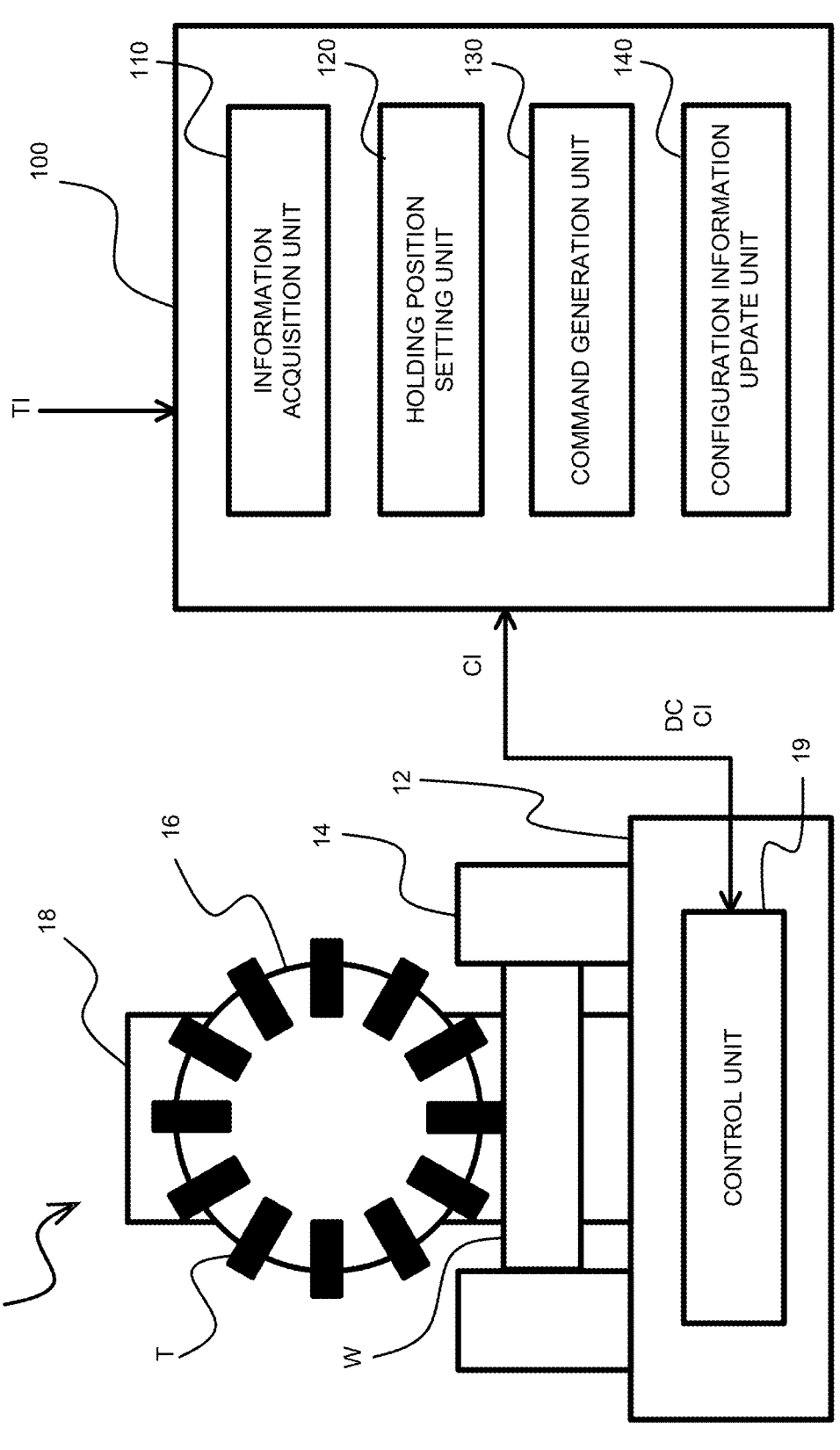
FIG. 7 is an outline drawing showing a second modification of the tool management device according to the first embodiment.

FIG. 7 is an outline drawing showing a second modification of the tool management device according to the first embodiment. In the second modification, the tool management device is equipped with a function of changing the configuration information CI stored in the control unit 19 of the machine tool 10 in a case where a change occurs in mounting status of the tools T on the turning turret 16.

In other words, as shown in FIG. 7, the tool management device 100 of the second modification further includes a configuration information update unit 140 that updates the configuration information CI based on the drive command DC generated in the command generation unit 130, in addition to the information acquisition unit 110, the holding position setting unit 120, and the command generation unit 130 shown in FIG. 1. The configuration information update unit 140 has a function of changing the configuration information CI acquired by the information acquisition unit 110 in consideration of the drive command DC generated by the command generation unit 130 for the control unit 19 of the machine tool 10, and returning the changed configuration information CI to the control unit 19.

Specifically, in the operations shown in FIG. 3 and FIG. 4, for example, the configuration information CI initially acquired by the information acquisition unit 110 includes information that "the tool T is not mounted at the holding position P2". Then, in the case where the tool T2 is newly mounted at the holding position P2 as shown in FIG. 4, without information that the tool T2 has been mounted at the holding position P2 described above when mounting another tool T next, the holding position setting unit 120 may repeatedly select and set the holding position P2 at which the tool T2 has already been mounted according to the old configuration information CI.

Thus, in the second modification, the configuration information update unit 140 included in the tool management device 100 generates new configuration information CI' updated by overwriting the configuration information CI acquired by the information acquisition unit 110 with change information for the holding position P included in the drive command DC outputted from the command generation unit 130, and transmits the configuration information CI' to the control unit 19 of the machine tool 10. This enables tool management in consideration of latest information on a holding status of the tools T on the turning turret 16. At this time, in a case of continuously mounting or swapping the tools T, the information acquisition unit 110 should operate so as to always acquire the latest configuration information CI.

Figure 8:
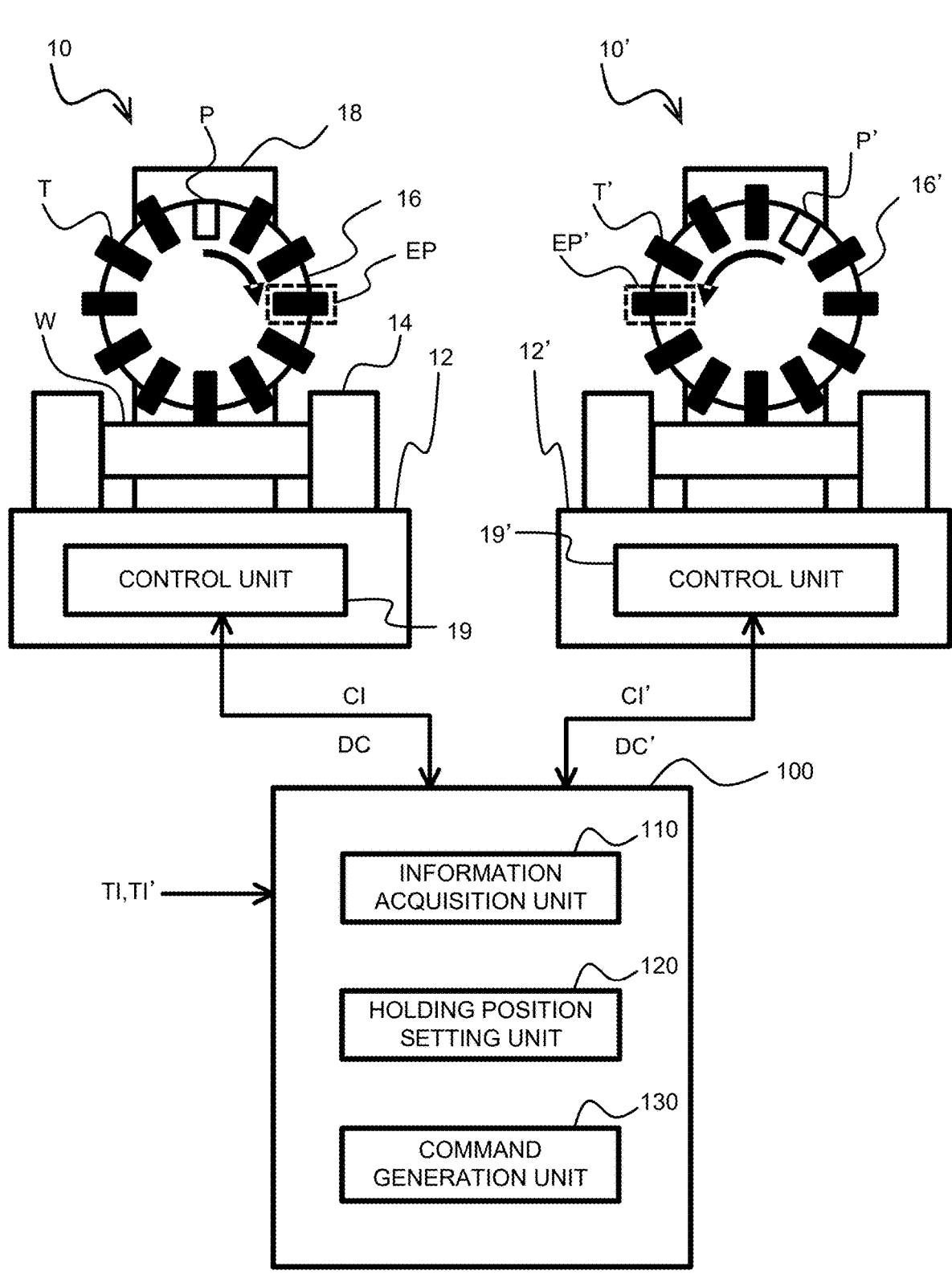
FIG. 8 is an outline drawing showing a third modification of the tool management device according to the first embodiment.

FIG. 8 is an outline drawing showing a third modification of the tool management device according to the first embodiment. In the third modification, the tool management device 100 is connected to the machine tools 10 and 10' which are a plurality of target devices to perform tool management for the plurality of target devices.

Figure 9:
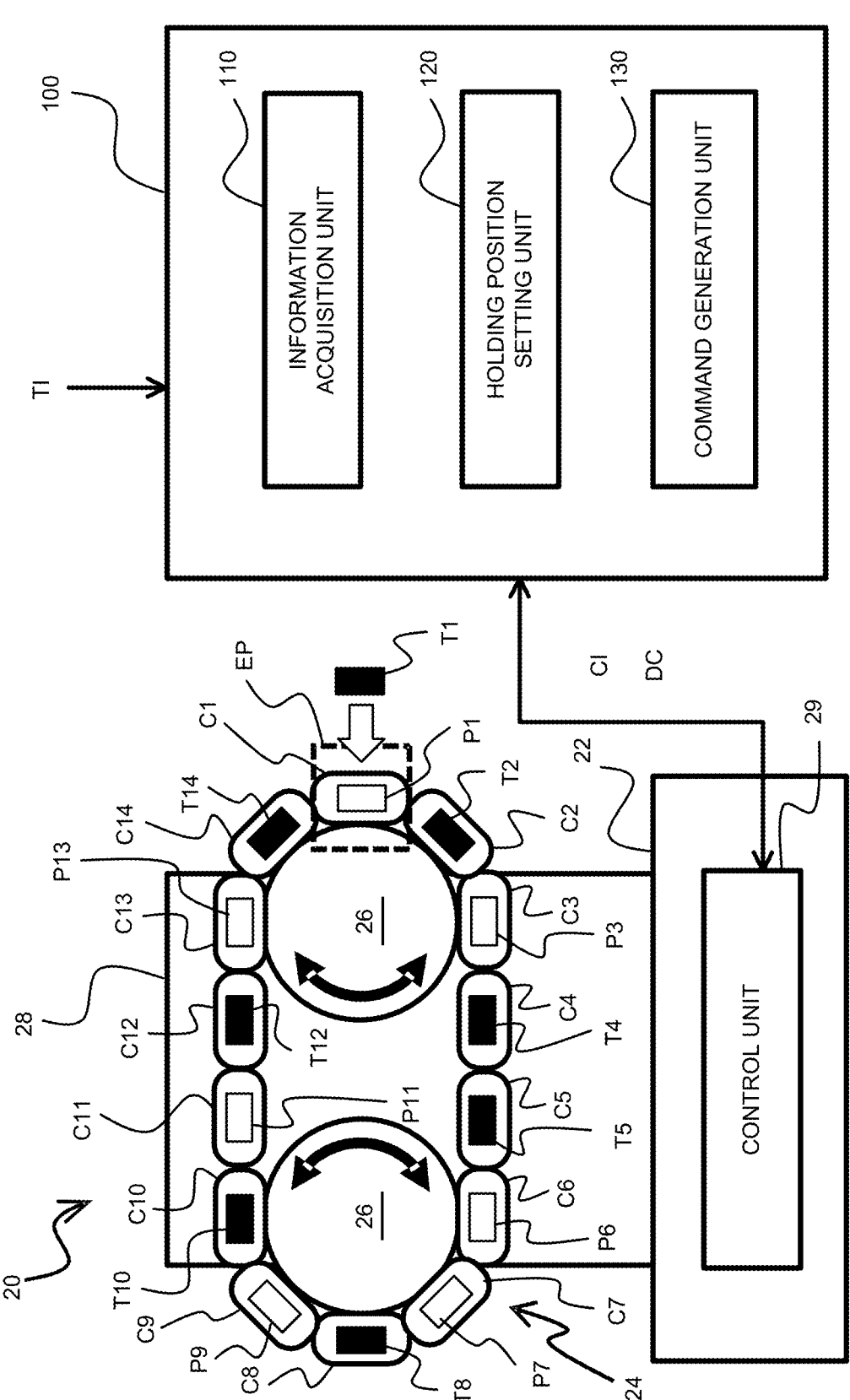
FIG. 9 is a block diagram showing a relationship between a tool management device according to a second embodiment of the present invention and a target device.

In other words, as shown in FIG. 8, the tool management device 100 of the third modification is configured as a machining system that is connected by wire or wirelessly to the machine tool 10 and the machine tool 10' which are the target devices that hold a plurality of tools, and exchanges signals and data with the plurality of the machine tools 10 and 10'. Note that although FIG. 9 illustrates the case where the tool management device 100 is connected to the two machine tools 10 and 10', the tool management device 100 may be configured to be connected to three or more target devices.

In the third modification, the information acquisition unit 110 of the tool management device 100 is individually connected to the plurality of the machine tools 10 and 10' when mounting or swapping a predetermined tool T, and can thus manage the tool T in a manner distributed to the machine tool 10 or 10' in accordance with the tool information TI. In other words, a tool can be mounted on or swapped from a machine tool designated for each of the types of machining on workpieces and machining conditions, or specification of the tool.

Specifically, in a case of intending to mount the tool T on the machine tool 10 or 10' in the configuration shown in FIG. 8, for example, the information acquisition unit 110 of the tool management device 100 first acquires the tool information TI on the tool T, and acquires the configuration information CI and CI' respectively from the control units 19 and 19' of the machine tools 10 and 10'. Then, the information acquisition unit 110 selects the configuration information CI as appropriate configuration information suitable for the acquired tool information TI.

Subsequently, the holding position setting unit 120 sets the holding position P for the tool T on the turning turret 16 based on the selected configuration information CI and the tool information TI. Then, the command generation unit 130 generates the drive command DC for moving the set holding position P to the transfer position EP, and outputs the drive command DC to the control unit 19.

Next, in a case of intending to mount another tool T' on the machine tool 10 or 10', the information acquisition unit 110 of the tool management device 100 acquires tool information TI' on the tool T'. Then, the information acquisition unit 110 selects the configuration information CI' as appropriate configuration information suitable for the newly acquired tool information TI'.

Subsequently, the holding position setting unit 120 sets a holding position P' for the tool T' on a turning turret 16' based on the selected configuration information CI' and the tool information TI'. Then, the command generation unit 130 generates a drive command DC' for moving the set holding position P' to a transfer position EP', and outputs the drive command DC' to the control unit 19'.

By repeatedly executing such operations, an appropriate one of the turning turrets 16 and 16' can be selected and the tool T intended to be mounted or swapped can be mounted and managed in consideration of the configuration information CI and CI' on the plurality of the machine tools 10 and 10'. Note that in the specific example described above, the case of initially acquiring the configuration information CI and CI' on the plurality of the machine tools 10 and 10', respectively, but it may be configured to selectively acquire the configuration information CI or CI' in accordance with the acquired tool information TI and TI'.

By including the configuration as described above, the information acquisition unit in the tool management device according to the first embodiment acquires configuration information including the current tool holding state in the tool holding mechanism (turning turret). Thus, the tool management device itself does not require a memory for always storing the configuration information about the target device (machine tool). In addition, the holding position setting unit sets the holding position at which a tool is held in the tool holding mechanism based on the configuration information and the tool information on the tool as described above, and the command generation unit generates the drive command for moving the holding position in the above-described tool holding mechanism to the transfer position at which the tool is transferred. Thus, the holding position is set based on the configuration information acquired by the information acquisition unit, and the drive command is generated. Thus, even if there is a change in the specification of the target device or a change in the target device itself, it is possible to deal with, and to eliminate the need to add or change the memory.

Second Embodiment

FIG. 9 is a block diagram showing a relationship between a tool management device according to a second embodiment of the present invention and a target device. Note that in the second embodiment, some components for which a configuration identical or common to that of the first embodiment shown in FIG. 1 to FIG. 8 may be adopted are denoted by identical reference characters, and their repeated description will be omitted.

As shown in FIG. 9, the tool management device 100 according to the second embodiment is configured as a tool storage system connected by wire or wirelessly to a target device (tool storage device) 20 that holds a plurality of tools and exchanges signals and data with the tool storage device 20. Herein, in the second embodiment, the tool storage device 20 including a chain-type tool stocker 24 as a tool holding mechanism is applied.

The tool storage device 20 configures, as an example, a tool storage unit including a base part 22, the chain-type tool stocker 24 that holds and stores the plurality of tools T, a pair of pulleys 26 that rotationally move the chain-type tool stocker 24, a tool stocker holding part 28 having a built-in drive mechanism that rotates the pair of pulleys 26, and a control unit 29 that controls operations of the entire tool storage device 20. In such a tool storage device 20, the plurality of tools T1 to T14 are held at holding positions (see the reference character P1 in FIG. 9) on individual chain elements C1 to C14 that configure the chain-type tool stocker 24. When the pair of pulleys 26 rotate based on a command from the control unit 29 to rotationally move the chain-type tool stocker 24, the specific tool T is moved to the transfer position EP.

The chain-type tool stocker 24 has, as an example, the plurality of the chain elements C1 to C14 coupled by a predetermined coupling mechanism (not shown) so as to move rotationally, and has tool holders (not shown) that hold the plurality of tools T1 to T14 at the holding positions P1 to P14, respectively. Herein, in the specific example of FIG. 9, the holding positions P1 to P14 are located at equal intervals in a coupling direction of the chain-type tool stocker 24.

In addition, in the chain-type tool stocker 24, using the position of the holding position P1 as a reference position, locating positions of the holding positions P1 to P14 are each determined in accordance with the degree of distance spaced from the reference position. In other words, the amount of turning (distance of movement of the chain elements C1 to C14) when a turning command for the chain-type tool stocker 24 is generated in the command generation unit 130 of the tool management device 100 which will be described later is obtained based on the distance (length) from this reference position.

Next, a specific operation of the tool management device according to the second embodiment will be described using FIG. 9. In the tool management device 100 according to the second embodiment, the information acquisition unit 110 first acquires the configuration information CI about the chain-type tool stocker 24 from the control unit 29 of the tool storage device 20.

Herein, the configuration information CI includes, as an example, information such as the number and locations of the holding positions P1 to P14 provided on the chain-type tool stocker 24, the number and numbers of the tool T1 to T14 having already been mounted at the holding positions P1 to P14, and further, the current position of the holding position P1 serving as the reference position. Note that similarly to the first embodiment, a sensor provided at each of the holding positions P1 to P14 may detect information about the presence or absence of the tool T, so that the positions at which the tools T1 to T14 described above are mounted may be acquired via the control unit 29.

The information acquisition unit 110 acquires the tool information TI concerning the tool T to be swapped from the outside together with the configuration information CI. The tool information TI at this time includes the number and specification of the tool T to be swapped, and the like, as described above. Then, the information acquisition unit 110 sends the configuration information CI and the tool information TI having been acquired to the holding position setting unit 120.

The holding position setting unit 120 selects any of the holding positions P1 to P14 in the chain-type tool stocker 24 suitable for the tool T targeted for swapping based on the configuration information CI and the tool information TI, and sends number information on the selected holding position to the command generation unit 130. At this time, as an example, a holding position which is present closest to the holding position P1 serving as the reference position and at which the tool T has not been mounted is selected similarly to the case in the first embodiment.

The command generation unit 130 calculates how much the chain element C having the holding position P set in order for the holding position P for the tool T set by the holding position setting unit 120 to be located at the transfer position EP of the tool T should be moved (that is, how much the chain-type tool stocker 24 should rotate), and generates the drive command DC for the control unit 29 of the tool storage device 20 for turning the chain-type tool stocker 24. Specifically, the command generation unit 130 calculates the amount of movement of the set holding position P to the transfer position EP, generates the drive command DC corresponding to the amount of rotation of the pair of pulleys 26 corresponding to the amount of movement, and outputs the drive command DC to the control unit 29.

Then, in a case of mounting (or swapping) the plurality of tools T on the chain-type tool stocker 24, the holding position setting unit 120 and the command generation unit 130 repeat the operations described above based on the configuration information CI having already been acquired. By performing such operations, the information acquisition unit 110 acquires the configuration information CI including the current tool holding state on the tool holding mechanism (the chain-type tool stocker 24). This eliminates the need to expand the memory for the tool management device 100 itself to always store the configuration information CI on the tool storage device 20.

By including the configuration as described above, in the tool management device according to the second embodiment, the information acquisition unit acquires and manages configuration information including the current tool holding state in the tool holding mechanism (the chain-type tool stocker) even in a case where the target device is changed from the machine tool 10 that performs machining to the tool storage device 20 that stores and manages tools. Thus, the tool management device itself does not require a memory for always storing the configuration information about the target device (machine tool). In addition, the holding position setting unit sets the holding position at which a tool is held in the tool holding mechanism based on the configuration information and the tool information on the tools as described above, and the command generation unit generates the drive command for moving the holding position in the above-described tool holding mechanism to the transfer position at which the tool is transferred. Thus, the holding position is set based on the configuration information acquired by the information acquisition unit, and the drive command is generated. Therefore, even if there is a change in the specification of the target device or a change in the target device itself, it is possible to deal with, and to eliminate the need to add or change the memory.

Note that although the second embodiment illustrates the case of the chain-type tool stocker as the tool holding mechanism in FIG. 9, a structure well known as a tool holding mechanism such as, for example, a rack-type magazine or a drum-type magazine may be applied. Also in such structures, effects of the invention of the present application can be obtained by calculating the amount of movement between the holding position at which a tool is held and the transfer position and outputting the drive command.

Third Embodiment

Figure 10:
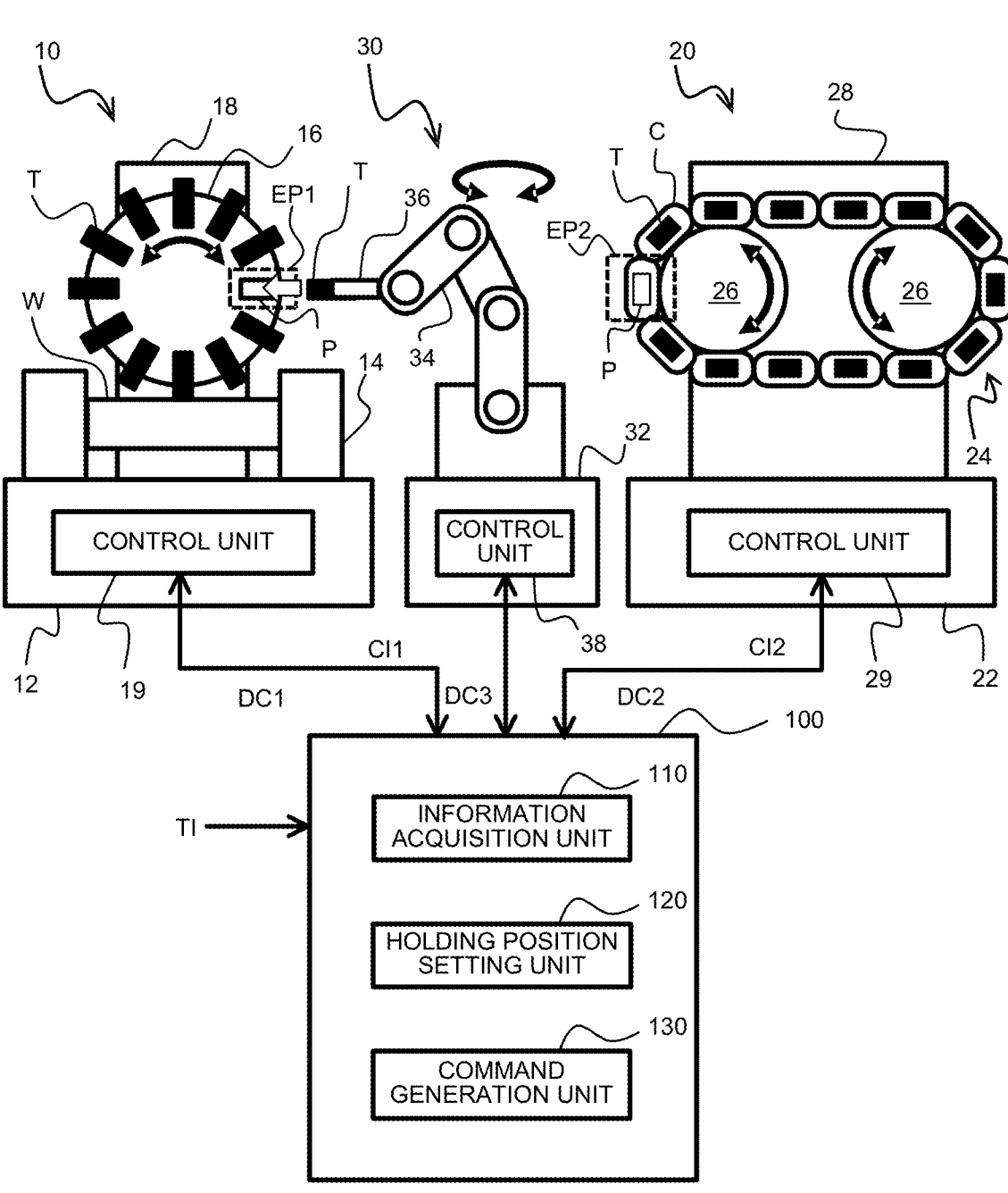
FIG. 10 is a block diagram showing a relationship between a tool management device according to a third embodiment of the present invention and a target device.

FIG. 10 is a block diagram showing a relationship between a tool management device according to a third embodiment of the present invention and a target device. Note that in the third embodiment, some components for which configurations identical or common to those of the first embodiment and the second embodiment shown in FIG. 1 to FIG. 9 may be adopted are denoted by identical reference characters, and their repeated description will be omitted.

As shown in FIG. 10, the tool management device 100 according to the third embodiment is, as an example, mutually connected by wire or wirelessly to the machine tool 10 shown in FIG. 1 that holds the plurality of tools T to machine the workpiece W, the tool storage device 20 shown in FIG. 9 that stores the plurality of tools T, and a tool transfer device 30 that transfers tools between the machine tool 10 and the tool storage device 20. Then, the tool management device 100 according to the third embodiment configures a machining system that mutually exchanges signals and data among the machine tool 10, the tool storage device 20, and the tool transfer device 30.

As shown in FIG. 10, the machine tool 10 is configured as a turret lathe including the base part 12, the workpiece holding part 14, the turning turret 16, the turret holding part 18, and the control unit 19. The tool storage device 20 configures a tool storage unit including the base part 22, the chain-type tool stocker 24, the pair of pulleys 26, the tool stocker holding part 28, and the control unit 29. Then, a transfer position EP1 in the machine tool 10 and a transfer position EP2 in the tool storage device 20 are located at positions opposite to each other.

On the other hand, the tool transfer device 30 is, as an example, configured as an articulated robot mechanism including a base part 32, a robot arm 34 formed of a plurality of arms, a tool gripping part 36 provided on one end of the robot arm 34, and a control unit 38 that controls operations of the entire tool transfer device 30. Then, the tool transfer device 30 is located such that when the robot arm 34 moves rotationally on the base part 32, the tool T can be exchanged between the machine tool 10 and the tool storage device 20.

Next, an operation of exchanging the tool T between the machine tool 10 and the tool storage device 20 by the tool management device 100 according to the third embodiment will be described.

In the machining system shown in the third embodiment, in a case of taking a predetermined tool T from the tool storage device 20 and intending to mount the predetermined tool T on the machine tool 10, for example, the information acquisition unit 110 of the tool management device 100 first acquires the tool information TI on the tool T, and acquires configuration information CI2 from the control unit 29 of the tool storage device 20. Subsequently, the holding position setting unit 120 determines whether there is a tool T that corresponds to the acquired tool information TI in the chain-type tool stocker 24 of the tool storage device 20, and in a case where the corresponding tool T is present, sets the holding position P at which the corresponding tool T is mounted, and sends the holding position P to the command generation unit 130.

Next, the command generation unit 130 generates a drive command DC2 for moving the set holding position P to the transfer position EP2 in the chain-type tool stocker 24, and outputs the drive command DC2 to the control unit 29. As a result, the pair of pulleys 26 of the tool storage device 20 rotates the chain-type tool stocker 24, and the designated tool T is moved to the transfer position EP2.

Subsequently, the information acquisition unit 110 acquires configuration information CI1 from the control unit 19 of the machine tool 10. Then, the holding position setting unit 120 determines whether there is a holding position P that corresponds to the designated tool T in the turning turret 16 of the machine tool 10, sets the holding position P, and sends the holding position P to the command generation unit 130.

Next, the command generation unit 130 generates a drive command DC1 for moving the set holding position P to the transfer position EP1 on the turning turret 16, and outputs the drive command DC1 to the control unit 19. As a result, the revolving turret 16 of the machine tool 10 is rotated, and the holding position P for attaching the specified tool T is moved to the transfer position EP1.

Subsequently, the command generation unit 130 generates a drive command DC3 for an operation of conveying the tool T from the transfer position EP2 in the tool storage device 20 to the transfer position EP1 in the machine tool 10, and outputs the drive command DC3 to the control unit 38 of the tool transfer device 30. At this time, the drive command DC3 may be merely a command to start the transfer operation for the tool transfer device 30, or may be an operation command including a position from the transfer position EP2 to the transfer position EP1 and a motion of the robot arm 34.

Such an operation enables a predetermined tool T to automatically move from the chain-type tool stocker 24 of the tool storage device 20 to the turning turret 16 of the machine tool 10 based on a command from the tool management device 100. Note that by issuing a command in a reversed flow of the above-described operation, the predetermined tool T can also be detached from the turning turret 16 of the machine tool 10 and moved to the chain-type tool stocker 24 of the tool storage device 20.

Although the above-described specific example illustrates the case of generating and outputting the drive command DC3 for the tool transfer device 30 after outputting the drive command DC1 or DC2 to the machine tool 10 or the tool storage device 20, it may be configured to generate and output the drive command DC3 during the operation performed by the drive command DC1 or DC2. As a result, the waiting time for the tool transfer device 30 to operate is reduced, so that the time required for moving the tool T can be also reduced.

By including the configuration as described above, the tool management device according to the third embodiment does not require a memory for always storing the configuration information of the target apparatus (machine tool) even in a machining system having an automatic tool change function that includes both the machine tool 10 and the tool storage device 20. In addition, similarly to the cases of the first and second embodiments, even if there is a change in the specification of the target device or a change in the target device itself, it is possible to deal with, and to eliminate the need to add or change the memory.

Note that the present invention can also be applied by combining the embodiments described above. For example, by connecting a plurality of the tool storage devices shown in the second embodiment to the tool management device according to the present invention, tool management can also be performed for the plurality of tool storage devices. The configuration including the configuration information update unit shown in the second modification of the first embodiment may be applied to the tool management device connected to the machining system shown in the third embodiment.

The present invention is not limited to the above-described embodiments, but can be changed as appropriate without departing from the spirit of the invention. According to the present invention, any component in the embodiments can be deformed or any component in the embodiments can be omitted within the scope of the invention.

The invention claimed is:

1. A tool management device for managing tools of a controlled device, the controlled device including a tool holding mechanism that holds the tools at holding positions, the tool management device comprising:
    an information acquisition unit configured to acquire configuration information including a current tool holding state in the tool holding mechanism from a control unit of the controlled device;
    a holding position setting unit configured to set the holding positions at which the tools are held in the tool holding mechanism based on the configuration information and tool information on the tools; and
    a command generation unit configured to generate a drive command for moving the holding positions in the tool holding mechanism to a transfer position at which the tools are transferred.

2. The tool management device according to claim 1, wherein
    the holding position setting unit is configured to set the holding positions to minimize an amount of movement to the transfer position.

3. The tool management device according to claim 1, wherein
    the tool holding mechanism has a plurality of classified regions for types of the tools, respectively, and
    the holding position setting unit is configured to set the holding positions for the tools, respectively, using a calculation reference position in the classified regions as a reference.

4. The tool management device according to claim 1, further comprising a configuration information update unit configured to update the configuration information based on the drive command.

5. The tool management device according to claim 1, wherein
    the tool management device is configured to control a plurality of controlled devices, and
    the information acquisition unit is further configured to:
        acquire pieces of configuration information corresponding to each of the plurality of controlled devices, respectively, from the plurality of the controlled devices, and
        select a piece of configuration information of the corresponding controlled device that is suitable for the tool information from among the corresponding pieces of configuration information.

6. The tool management device according to claim 1, wherein the controlled device is a machine tool, and the tool holding mechanism is a turning turret of the machine tool.

7. The tool management device according to claim 1, wherein the controlled device is a tool storage device, and the tool holding mechanism is a tool stocker of the tool storage device.

8. The tool management device according to claim 1, wherein the controlled device includes a machine tool and a tool storage device, the machine tool includes a turning turret as a first tool holding mechanism, the tool storage device includes a tool stocker as a second tool holding mechanism, the holding position setting unit is configured to:

set a first holding position based on first configuration information for the first tool holding mechanism and the tool information, and set a second holding position based on second configuration information for the second tool holding mechanism and the tool information, and the command generation unit configured to generate a first drive command for moving the first holding position to the transfer position, and a second drive command for moving the second holding position to the transfer position.

* * * * *